United States Patent
Mueller et al.

(10) Patent No.: US 7,682,415 B2
(45) Date of Patent: Mar. 23, 2010

(54) DEVICE FOR THE INTERMEDIATE STORAGE OF CONDENSATION WATER

(75) Inventors: Roland Mueller, Friedrichshafen (DE);
Helmut Westermann, Markdorf (DE);
Ulf Wittkamp, Immenstaad (DE);
Joachim Lucas, Herdwangen-Schoenach (DE); Klaus Bockstahler, Bermatingen (DE); Johannes Witt, Voorhout (NL);
Berengere Houdou, Angers (FR)

(73) Assignee: EADS Space Transportation GmbH, Bremen (DE)

( * ) Notice: Subject to any disclaimer, the term of this patent is extended or adjusted under 35 U.S.C. 154(b) by 628 days.

(21) Appl. No.: 11/639,325

(22) Filed: Dec. 15, 2006

(65) Prior Publication Data

US 2007/0142198 A1 Jun. 21, 2007

(30) Foreign Application Priority Data

Dec. 16, 2005 (EP) .................................. 05027558

(51) Int. Cl.
*B01D 45/00* (2006.01)
(52) U.S. Cl. ............................. 55/434; 55/423; 55/413; 55/414; 55/455; 55/456; 55/457; 55/464; 55/466; 55/392; 55/DIG. 17; 95/269; 95/32
(58) Field of Classification Search .................. 55/434, 55/423, 413–414, 455–457, 464, 466, 392, 55/DIG. 17; 95/269, 32; 422/62
See application file for complete search history.

(56) References Cited

U.S. PATENT DOCUMENTS

| | | | | |
|---|---|---|---|---|
| 3,915,673 A | * | 10/1975 | Tamai et al. ................... 95/35 |
| 4,092,130 A | * | 5/1978 | Wikdahl ......................... 95/34 |
| 4,832,709 A | * | 5/1989 | Nagyszalanczy ............. 95/270 |
| 6,716,269 B1 | * | 4/2004 | Graff et al. ..................... 95/35 |
| 7,591,882 B2 | * | 9/2009 | Harazim ....................... 95/270 |
| 2006/0021356 A1 | | 2/2006 | Milde et al. | |

FOREIGN PATENT DOCUMENTS

| | | |
|---|---|---|
| DE | 2 325 118 | 10/1974 |
| EP | 1 170 556 A1 | 1/2002 |
| EP | 1 621 243 A1 | 2/2006 |
| RU | 739 864 A1 | 7/1996 |

* cited by examiner

*Primary Examiner*—Jason M Greene
*Assistant Examiner*—Dung Bui
(74) *Attorney, Agent, or Firm*—Crowell & Moring LLP

(57) ABSTRACT

A device for intermediate storage of condensation water includes a swirl body which causes an inflowing air-water mixture to rotate, and a venturi tube through which the air-water mixture leaves the device. A ring groove in which water accumulates because of the swirl is arranged downstream of the swirl body, and water accumulated in the ring groove is sucked into the venturi tube via one more suction pipes. An expansion zone has an expanded cross-section and a step shaped interior for generating increased surface adhesion. Separating metal sheets in the expansion zone brake the swirl, bind the accumulated gushing water by adhesion forces, and guide it by capillary forces to the interior surface of the expansion zone. Gushing water accumulated at the ends of the separating metal sheets is drained by one or more suction pipes, into the venturi tube.

5 Claims, 2 Drawing Sheets

DEVICE FOR THE INTERMEDIATE STORAGE OF CONDENSATION WATER

BACKGROUND AND SUMMARY OF THE INVENTION

This application claims the priority of German patent document 05 027 558.5-2113, filed Dec. 16, 2005, the disclosure of which is expressly incorporated by reference herein.

The invention relates to a device for intermediate storage of condensation water, particularly for insertion between a condensing heat exchanger and a water separator.

During the water separation in a condensing heat exchanger, condensation water collects between the air fins of the heat exchanger. European Patent Document EP 1 170 556 B1 discloses a condensing heat exchanger which achieves a very effective removal of the condensate from the fin structure of the heat exchanger, by means of a specific capillary geometry. Still a further reduction of the condensate collecting in the heat exchanger can be achieved by briefly increasing the air quantity flowing through the heat exchanger. A brief gush of water (typically lasting several seconds) occurs from the condensing heat exchanger into the water separator on the output side. This gush of water may lead to an overloading of the water separator and thus to the release of water drops into the cooled condensed-out air volume flow. At zero gravity, such free-flying water drops represent a considerable danger potential for electric and electronic devices.

This problem could be overcome by designing a large water separator, so that even a very large gush of condensate could be processed without any malfunction. The resulting increased space and energy demand, however, is not acceptable for aerospace applications.

It is an object of the invention to provide a device which avoids the described overloading of the water separator can be avoided without requiring a significant increase of the space and energy demand.

This and other objects and advantages are achieved by the device according to the invention in which, as a result of the intermediate storage of the condensate, the brief gush of water is converted to a prolonged flow with a lower peak value. The condensate flow in the heat exchanger can therefore be reliably removed, which prevents the water drops from reaching the cooled air flow and the size or the power requirement of the water separator from having to be increased.

In all condensing heat exchangers with water separators, the device according to the invention can preferably be used for the operation at zero gravity.

Other objects, advantages and novel features of the present invention will become apparent from the following detailed description of the invention when considered in conjunction with the accompanying drawings.

DETAILED DESCRIPTION OF THE DRAWINGS

Figure 1:
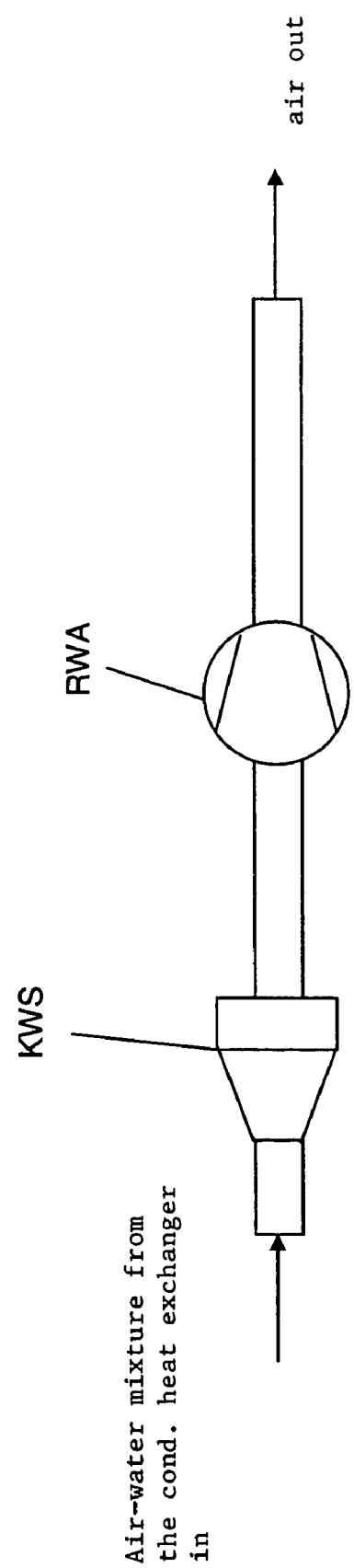
FIG. 1 is a view of the basic arrangement of the device according to the invention for the intermediate storage of condensation water between the condensing heat exchanger and the water separator.

FIG. 1 illustrates the basic arrangement of the intermediate storage device according to the invention (KWS) between a condensing heat exchanger (not shown in the figure) and the assigned water separator RWA. The condensing heat exchanger described in European Patent Document EP 1 170 556 B1 may be used, for example, as the condensing heat exchanger, in which case very effective removal of the condensate from the fin structure of the heat exchanger is achieved by means of a specific capillary geometry. The air-water mixture emerging from the condensing heat exchanger is fed to the water separator RWA, in which a further separation of the water from the air-water mixture takes place. In particular, the component RWA may be a so-called rotational water separator. The cooled air flow, from which the water was removed, leaves the water separator RWA and can, for example, be fed to an air flow for the air-conditioning of manned closed spaces.

In order to ensure that the water separator RWA can process the occurring condensate flow at any point in time, even in the case of "gush-type" loads, without malfunctioning, the intermediate condensate storage device (KWS) according to the invention is connected in front of the water separator RWA.

Figure 2:
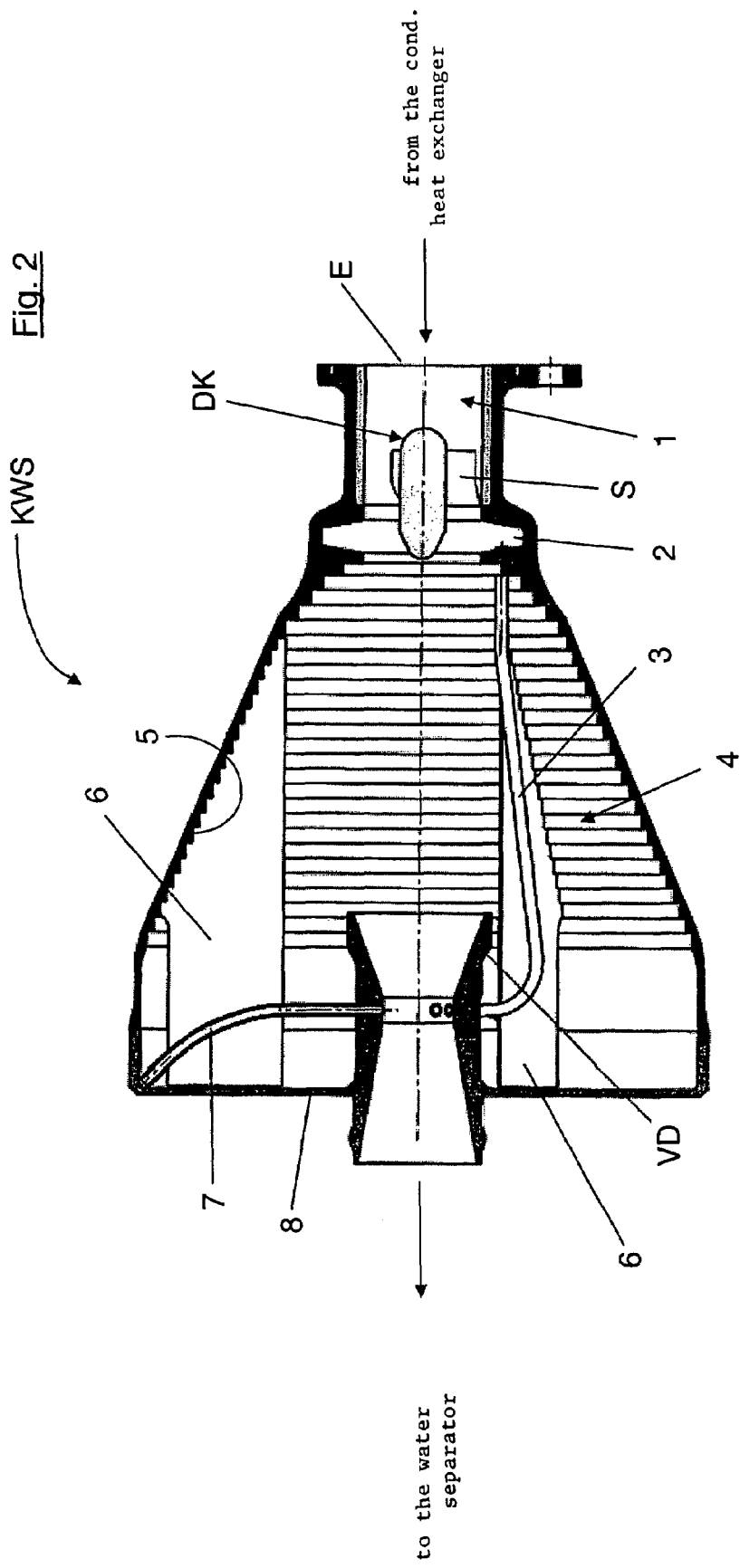
FIG. 2 is a view of the construction of the device according to the invention for the intermediate storage of condensation water.

FIG. 2 is an axial sectional view of the device KWS according to the invention which, in this embodiment, has an essentially rotationally symmetrical conical shape. The air-water mixture coming from the condensing heat exchanger flows via the inlet E into the device KWS and exits by way of a venturi tube VD at the opposite end. In the inlet area 1, which has a constant cross-section, the inflowing air-water mixture impacts on a swirl body DK, which causes the air-water mixture to rotate. In this embodiment, the swirl body comprises four blades S distributed along the circumference, of which only one is visible in FIG. 2. The inside diameter of the device expands downstream, behind the swirl body, forming a conical expansion zone 4. Because of the swirl provided at the swirl body DK and because of the reduction of the flow rate in the enlarged flow cross-section, gushing water accumulates in the expansion zone 4 as soon as a gush of water enters into the device KWS. To increase the surface adhesion force, the interior surface 5 of the expansion zone 4 is not smooth but has a step-shaped construction, the angle between the two legs of a step amounting to just 90 degrees. Other angles are also conceivable, particularly those greater than 90 degrees.

Several separating metal sheets 6, which are evenly distributed about the circumference and extend in the axial direction to the rearward end wall 8 of the device KWS, are situated in the expansion zone 4. (In the illustrated embodiment, three separating metal sheets 6 are provided which are each offset by 120 degrees.) The normal-line vector of the metal sheets 6 is therefore preferably perpendicular to the main axis of the intermediate storage device. In addition, the separating metal sheets 6 preferably form a right angle with the interior surface of the expansion zone.

The separating metal sheets 6 break the swirl of the gushing water and of the air flow, bind the accumulated gushing water on their surface as a result of adhesion forces, and guide the gushing water by capillary forces to the interior surface 5 of the expansion zone 4. From there, the accumulated gushing water is driven, as a result of the axial flow of the air-water mixture and of the capillary force effect between the interior surface 5 and the separating metal sheet 6, along the interior surface to the rearward end of the device KWS in the area of the end wall 8. In this area, the inlets of three suction pipes 7 are situated which are evenly distributed about the circumference and which introduce the gushing water into the venturi tube VD, so that the water is returned into the air-water mixture. However, as a result of the described transport mechanisms, this return takes place with a time delay. An intermediate storage of the gushing water is thereby achieved. The brief gush of water is: "stretched out" or prolonged, so that the water separator connected on the output side is protected from overloading.

It was found during the testing operation that, even in the normal operation (that is, outside the gushing phases), water tends to accumulate in the expansion zone. This is undesirable because it may lead to a gush-type loading of the water separator connected on the output side—an effect which specifically is to be avoided by the invention. To address this concern, a ring groove is arranged downstream directly behind the swirl body, in which ring groove the water deflected by the swirl body can be collected mainly during the normal operation (no increased water fraction in the inflowing air-water mixture). From there, the water is sucked into the venturi tube VD at the outlet of the device by means of suction pipes 3, (for example, two suction pipes offset by 180 degrees).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for the intermediate storage of condensation water from a flowing air-water mixture, said device comprising:
    an inlet area;
    a swirl body in the inlet area, which swirl body causes an inflowing air-water mixture to rotate;
    a venturi tube, by which the air-water mixture leaves the device;
    a ring groove is arranged downstream of the swirl body, in which water accumulates due to the swirl;
    a plurality of suction pipes by which water accumulated in the ring groove is sucked into the venturi tube;
    an expansion zone having an expanded cross-section, in which splashing water accumulates due to a flow rate reduction and due to the swirl, an interior surface of the expansion zone having a step-shaped construction for generating an increased surface adhesion force;
    a plurality of separating metal sheets in the expansion zone, which metal sheets are disposed to brake the swirl and bind accumulated gushing water by adhesion forces, and guide it by capillary forces to the interior surface of the expansion zone;
    wherein, gushing water accumulated at ends of the separating metal sheets is sucked via suction pipes into the venturi tube for delayed return of the splashing water into the air-water mixture.

2. The device according to claim 1, wherein said device is connected between a condensing heat exchanger and a water separator.

3. Apparatus for regulating a flow of condensation water from an air/water mixture, said apparatus comprising:
    an enclosure having an inlet area for receiving a flow of said air/water mixture, an expansion area, and an outlet tube, said expansion area having a cross-sectional area that increases in the direction from the inlet area to the outlet tube;
    a swirl body situated in said inlet area, which imparts a swirl to said air/water mixture which enters said apparatus through said inlet area;
    a plurality of planar elements in said expansion area, each of which is disposed along a longitudinal axis of the apparatus;
    a ring groove arranged downstream of said swirl body, for accumulating water from the swirled air/water mixture; and
    a first plurality of tubes connected to convey water accumulated at downstream ends of the planar elements, into the outlet tube.

4. The apparatus according to claim 3, further comprising a second plurality of tubes connected to convey water accumulated in said ring groove to said outlet tube.

5. The apparatus according to claim 3, wherein said interior surface has a substantially stair-stepped configuration.

\* \* \* \* \*